United States Patent
Hrovat et al.

(10) Patent No.: US 7,266,437 B2
(45) Date of Patent: Sep. 4, 2007

(54) TEMPERATURE DEPENDENT TRIGGER CONTROL FOR A TRACTION CONTROL SYSTEM

(75) Inventors: Davor Hrovat, Ann Arbor, MI (US); Ralph Cunningham, Milan, MI (US); Peter Lazarevski, Dearborn, MI (US); Eric Tseng, Canton, MI (US); Charles Bannon, Northville, MI (US); Michael Fodor, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 11/161,496

(22) Filed: Aug. 5, 2005

(65) Prior Publication Data

US 2007/0032938 A1   Feb. 8, 2007

(51) Int. Cl.
*B60T 7/12* (2006.01)
*G05F 7/00* (2006.01)
*G06F 17/00* (2006.01)
(52) U.S. Cl. .............................. 701/82; 701/87; 701/91; 701/69; 701/54; 701/38; 180/197; 180/244
(58) Field of Classification Search ................ 701/82, 701/84, 87, 91, 93, 94, 95, 99, 110, 116, 70, 701/69, 61, 54, 53, 41, 38, 74; 303/113.2, 303/133, 139, 143, 114.1; 180/248, 197, 180/249, 233, 244; 192/114 R, 57, 58.41; 324/161
See application file for complete search history.

(56) References Cited

U.S. PATENT DOCUMENTS

| | | | | |
|---|---|---|---|---|
| 4,914,386 A * | 4/1990 | Zocholl | ........................ | 324/772 |
| 4,985,838 A * | 1/1991 | Hashiguchi et al. | ........... | 701/90 |
| 5,141,071 A * | 8/1992 | Edahiro et al. | .............. | 180/197 |
| 5,168,952 A * | 12/1992 | Oono et al. | .................. | 180/197 |
| 5,231,339 A * | 7/1993 | Kishimoto et al. | ......... | 318/807 |
| 5,275,474 A * | 1/1994 | Chin et al. | ................... | 303/148 |
| 5,315,519 A * | 5/1994 | Chin et al. | ..................... | 701/72 |
| 5,351,779 A * | 10/1994 | Yamashita | ................... | 180/197 |
| 5,357,435 A * | 10/1994 | Yasuda | ........................ | 701/83 |
| 5,365,444 A * | 11/1994 | Suzuki et al. | .................. | 701/74 |
| 5,407,023 A * | 4/1995 | Yamashita et al. | .......... | 180/197 |
| 5,504,680 A * | 4/1996 | Yamashita et al. | ............ | 701/90 |
| 5,573,313 A * | 11/1996 | Suzuki et al. | ............. | 303/115.2 |
| 5,577,816 A * | 11/1996 | Suzuki et al. | ................ | 303/174 |
| 5,636,909 A * | 6/1997 | Hirao et al. | ................. | 303/140 |
| 5,732,369 A * | 3/1998 | Hirano | .......................... | 701/1 |
| 5,749,062 A | 5/1998 | Yamamoto et al. | | |
| 5,765,657 A * | 6/1998 | Fukumura et al. | .......... | 180/197 |
| 5,850,616 A | 12/1998 | Matsuno et al. | | |
| 6,042,265 A * | 3/2000 | Kliman et al. | ............... | 374/152 |
| 6,061,622 A * | 5/2000 | Probst | .......................... | 701/84 |
| 6,141,618 A * | 10/2000 | Yamashita et al. | ............ | 701/84 |

(Continued)

*Primary Examiner*—Thomas Black
*Assistant Examiner*—Jorge O. Peche
(74) *Attorney, Agent, or Firm*—Fred Owens

(57) ABSTRACT

A method a operating a traction control system using a traction controller (30) for an automotive vehicle (10) is provided. A slip target is first determined. Then, an operating temperature turning characteristic or slope of the slip curve may, in combination or alone, be used to adjust the slip trigger threshold above the slip target. Traction control mode is entered when the driven wheel speed is above the slip trigger threshold.

21 Claims, 3 Drawing Sheets

U.S. PATENT DOCUMENTS

| | | |
|---|---|---|
| 6,324,458 B1 | 11/2001 | Takagi et al. |
| 6,330,505 B1 * | 12/2001 | Schmitt et al. ............... 701/82 |
| 6,456,922 B1 * | 9/2002 | Gamberg .................... 701/71 |
| 6,566,840 B1 * | 5/2003 | Wu et al. ................... 318/727 |
| 6,580,994 B2 * | 6/2003 | Katayama et al. ............ 701/69 |
| 6,646,412 B2 * | 11/2003 | Wu et al. ................... 318/801 |
| 6,652,415 B2 * | 11/2003 | Segawa et al. .............. 477/62 |
| 6,915,193 B2 | 7/2005 | Lu et al. |
| 2002/0052265 A1 * | 5/2002 | Segawa et al. ............... 477/62 |
| 2003/0151385 A1 * | 8/2003 | Wu et al. ................... 318/727 |
| 2005/0187695 A1 * | 8/2005 | Fangeat et al. ............... 701/71 |
| 2005/0222717 A1 * | 10/2005 | Erban et al. .................... 701/1 |
| 2005/0236894 A1 * | 10/2005 | Lu et al. ..................... 303/139 |
| 2006/0069523 A1 * | 3/2006 | Kanekawa et al. ........... 702/84 |

\* cited by examiner

TEMPERATURE DEPENDENT TRIGGER CONTROL FOR A TRACTION CONTROL SYSTEM

TECHNICAL FIELD

The present invention relates generally to a traction control system, and more particularly, to trigger control that depends on temperature to reduce false activations.

BACKGROUND

Traction control systems attempt to optimize vehicle acceleration and handling performance under low road/tire interface friction levels by controlling the slip of the driven wheels through wheel torque management via powertrain torque and possibly brake torque control. In certain conditions, aggressive traction control intervention is not required. Such conditions such as in large throttle tip-ins on dry roads may cause instantaneous short wheel spins. Other conditions such as driving across a rough road on a warm day also do not require aggressive traction control intervention. Such interventions are unintended. The feature that is common in such conditions is the environmental temperature. In warm conditions, snow and ice are not likely.

In typical traction control systems a slip target is set for the driven wheels. Thus, when the wheel speed of the driven wheel exceeds the slip target, traction control intervenes to maintain traction of the wheel. One example of this concept is set forth in U.S. Pat. No. 6,330,505. In the '505 patent, the target slip level defines the slip threshold. In the '505 patent, the outside air temperature is taken into consideration so that the target slip level is adjusted up or down. In high temperatures the target slip is raised and in low temperatures the target slip is lowered. The threshold remains at the target slip line. One drawback to such a system is that unintended activation may still be present.

It would therefore be desirable to prevent unintended activations in a traction control system when aggressive traction control system intervention is not required.

SUMMARY

The present invention improves a traction control system by allowing the traction control system to adjust the slip trigger threshold independently of the target slip.

In one aspect of the invention, a method of controlling traction of a vehicle comprises determining a slip target, determining an operating temperature, determining a traction control slip trigger threshold above the slip target in response to the temperature and entering a traction control mode when a driven wheel is above the slip trigger threshold.

In a further aspect of the invention a turning characteristic may be used to change the slip trigger threshold. A method of controlling traction of a vehicle in this aspect comprises determining a slip target, determining a turning characteristic, determining a traction control slip trigger threshold above the slip target in response to the turning characteristic and entering a traction control mode when a driven wheel is above the slip trigger threshold.

In yet another aspect of the invention, a method of controlling traction of a vehicle comprises determining a target slip, determining a change in slip, determining a traction control slip trigger threshold above a slip target in response to the change in slip and entering a traction control mode when a driven wheel is above the slip trigger threshold.

One advantage of the invention is that the threshold is changed independently from the slip target to allow an increased amount of slip before entering the traction control mode. Consequently, unintentional activations of the system are reduced.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
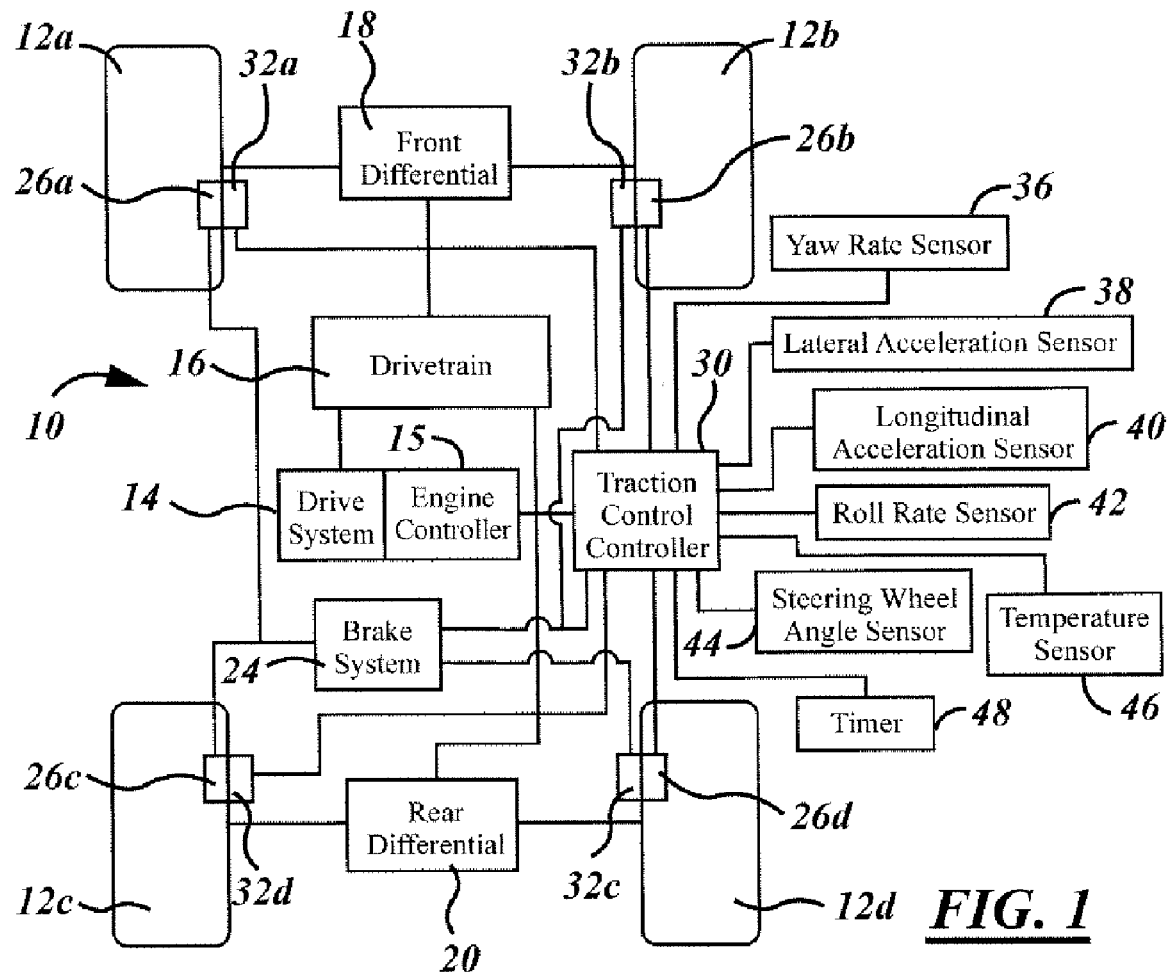
FIG. 1 is a block diagrammatic view of a vehicle having a traction control system according to the present invention.

The following figures describe a traction control system that may be used for an engine only traction control system. However, the teachings of the present invention may also be applicable to engine and brake-type traction control systems.

An automotive vehicle 10 is illustrated having wheel and tire assemblies 12a, 12b, 12c, and 12d. A drive system 14 coupled to a drivetrain 16 provides power to the wheel and tire assemblies 12 through the front differential 18 and rear differential 20. The drive system 14 may include an engine controller 15 that is microprocessor-based. The engine controller 15 may be used to control the amount of torque and thus the amount of slip generated at each of the wheels. The drive system 14 may vary the amount of engine power to effect the change in torque at the wheel and tire assemblies 12. A reduction in the amount of fuel and changing other parameters may reduce the amount of power output from the engine. It should also be noted that the drive system may include an internal combustion-only type system, a hybrid system, an electric drive system, or a fuel cell system.

The drive system 14 provides torque through the drivetrain 16 which may include a transmission, front differential 18 and rear differential 20. In a rear wheel drive vehicle, only the rear differential 20 would be present. A four or all-wheel drive system may include both the front differential 18 and the rear differential 20. Also, in certain all-wheel drive systems an additional center differential may be provided.

A brake system 24 that may include electric, electro-hydraulic, or hydraulic systems is used to actuate the brakes 26a, 26b, 26c, and 26d. The brakes are activated in response to driver input. The brake system 24 may also be activated in response to a traction control system that includes a traction control controller 30.

The traction control system and thus the controller 30 may be coupled directly or indirectly to wheel speed sensors 32a, 32b, 32c, and 32d. As illustrated, the wheel speed sensors are coupled directly to the wheels. The wheel speed sensors may be the output from an anti-lock brake system, an axle sensor or the like.

It should be noted that the wheels driven by the drive system 14 are referred to as driven wheels whereas wheels that are not coupled to the engine are referred to as undriven wheels. In the following description the speed of the undriven wheels may be used as the reference speed. In four-wheel or all-wheel drive systems no wheels are undriven and thus various algorithms may be used to determine the reference speed. The reference speed may correspond to a vehicle speed. Wheels that are touching the road surface and have a torque level below a certain torque threshold may be included in such algorithms.

The traction controller 30 is coupled to the drive system 14. The traction controller 30 may generate a control signal or torque command to reduce the amount of torque to the engine upon the sensing of a slipping wheel.

Various dynamic sensors may be coupled to the traction controller 30. Dynamic sensors may include a yaw rate sensor 36, a lateral acceleration sensor 38, and a longitudinal acceleration sensor 40. The yaw rate sensor 36 generates a yaw rate signal corresponding to the yaw rate of the vehicle. From the yaw rate sensor 36 the yaw acceleration may also be determined. The lateral acceleration sensor 38 generates a lateral acceleration signal corresponding to the lateral acceleration of the vehicle body. The longitudinal acceleration sensor 40 generates a longitudinal acceleration signal corresponding to the longitudinal acceleration of the vehicle. The various sensors may be directly coupled to the traction controller 30 or may be coupled to various vehicle dynamic control systems such as a yaw control system or a rollover stability control system. A roll rate sensor 42 may also be used to determine load transfer for the vehicle.

Other sensors coupled to the traction controller 30 may include a steering wheel angle sensor 44 that generates a steering wheel angle signal corresponding to the angle of the hand wheel within the vehicle. From the steering wheel angle sensor, the angle of the steered wheels on the pavement may be determined using the known gearing ratio of the steering system. Also, the steering wheel angle sensor may also be a direct sensor coupled to the steering actuator itself at or near the steered wheels.

Temperature sensor 46 may also be coupled to the traction controller 30. Temperature sensor 46 generates a temperature sensor signal corresponding to the temperature around the vehicle. The temperature sensor may, for example, include an air intake temperature sensor commonly found on vehicles. Other temperature sensors may be located at various other places around the vehicle. The temperature sensor 46 gives an indication to the ambient temperature surrounding the vehicle.

A timer 48 may also be coupled to the traction controller 30. The timer controller 48 may time various conditions of the vehicle. For example, the timer 48 may monitor the amount of time since entering the traction control mode when a driven wheel is above the slip target for a predetermined time. The timer 48 may be a stand alone timer or an integral part of a microprocessor.

Figure 2:
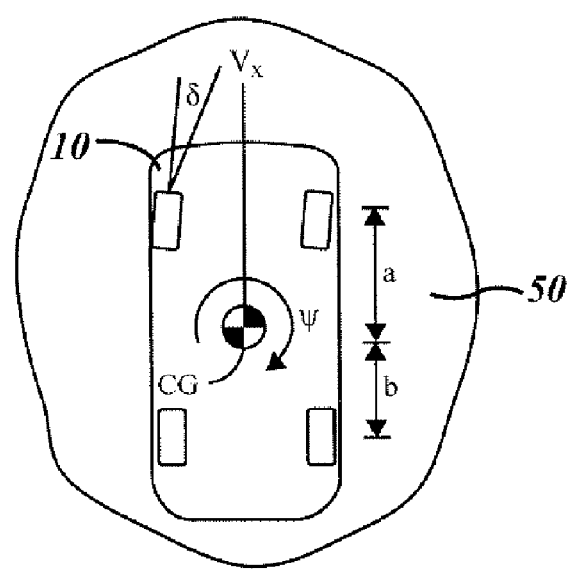
FIG. 2 is a diagrammatic view of a vehicle with associated variables thereon.

Referring now to FIG. 2, automotive vehicle 10 with various variables associated therewith is illustrated. The vehicle 10 is disposed on road surface 50 and has a center of gravity CG. The weight of the vehicle is the $m_v g$. The vehicle velocity is in the direction $V_x$. The distance between the front wheel axle and the center of gravity is given by a. The distance between the center of gravity and the rear axle is given by b. The yaw rate $\psi$ or yaw acceleration $\dot{\psi}$ is shown around the center of gravity of the vehicle.

Figure 3:
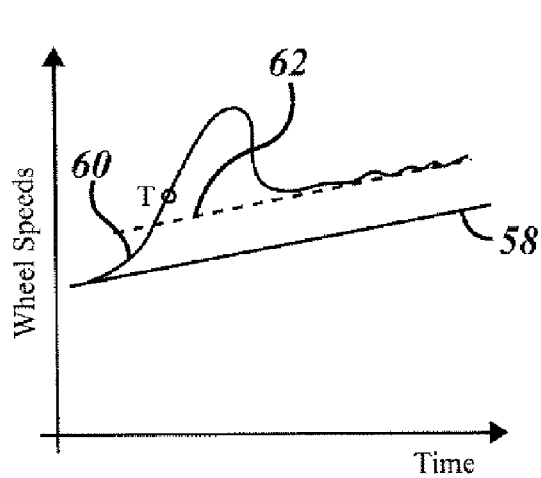
FIG. 3 is a plot of wheel speed versus time for a first embodiment illustrating a slip trigger.

Referring now to FIG. 3, a plot of wheel speed versus time is illustrated. A straight line 58 illustrates the reference speed. As described above, the reference speed may correspond to the non-driven or undriven wheels in a two-wheel drive vehicle or a reference speed used to determine the reference speed of the vehicle in an all-wheel drive or four-wheel drive system. The wheel speed of an driven wheel 60 is illustrated as a curved line. Another straight line illustrated by dotted line 62 illustrates a target slip level. The target slip level may, for example, be a fixed percentage above the reference line 58. The slip trigger T is illustrated above the target slip line 62. In many conventional systems the target slip level is the actuation point for the traction control system. In the present invention the slip trigger threshold T above the target slip 62 is used to trigger the intervention of the traction control system. The present invention advantageously allows the suppression of unintended traction control intervention. As will be described below, the slip trigger may be formed using various criteria including ambient temperature, a steering or turning characteristic, or combinations of both.

Figure 4:
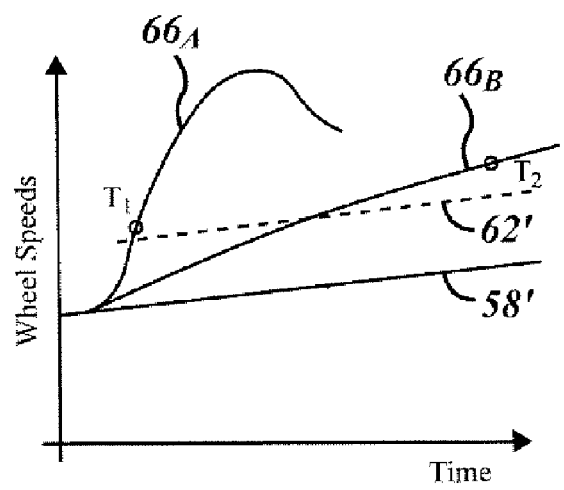
FIG. 4 is a plot of wheel speed versus time for a second embodiment illustrating a pair of slip triggers.

Referring now to FIG. 4, the same lines illustrated in FIG. 3 are illustrated but primed. In this example, two driven wheel speeds $66_A$ and $66_B$ are illustrated. With respect to signal $66_A$, the slope or change in the curve is determined. The slope or change in the curve corresponds to slip acceleration. In signal $66_A$, the slope corresponds to a steep slope when the slip acceleration or change in slip is low, the threshold $T_1$ is changed to just above the slip target 62'. In line $66_B$, the slope of the line is less than that of line $66_a$. Therefore, the slip level is increased to $T_2$.

Figure 5:
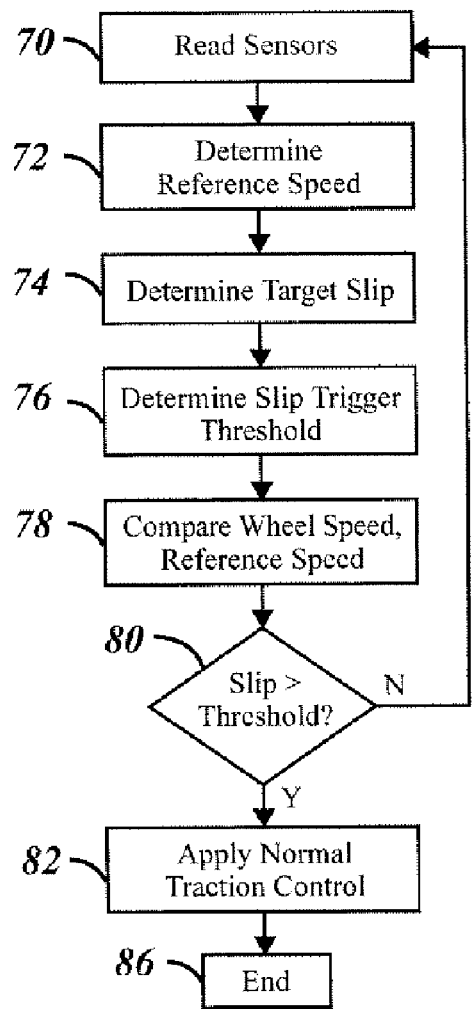
FIG. 5 is a flow chart illustrating a method for operating the invention.

Referring now to FIG. 5, a method for operating the present invention is illustrated. In step 70, the various sensors appropriate for the system are read. Suitable sensors include those illustrated in FIG. 1. In step 72, a reference speed is determined. As mentioned above, the reference speed may correspond to the speed of the undriven wheels. In a four-wheel drive vehicle, the reference speed may be determined using various speeds.

In step 74 a target slip is determined. The target slip may be determined in various ways including a certain percentage of slip may be tolerable. As will be further described below, various methods for adjusting the target slip may also be set forth.

In step 76, the slip trigger threshold is determined. The slip trigger threshold may, for example, be determined using the ambient temperature that is sensed using the temperature sensor illustrated in FIG. 1. For example, when the temperature indicates a high ambient temperature, the slip trigger threshold may be increased. A one-dimensional table with ambient temperature on the x-axis may be used. A slip trigger multiplier factor may be used on the y-axis. The temperature may also be used to change the target slip. However, the target slip and the slip trigger threshold are maintained separately and independently. As illustrated in FIG. 4, the initial slope of the wheel slip curve may also be used to adjust the slip trigger threshold in step 76. Thus, the slip trigger threshold may be increased when initial acceleration is low. This may be suitable when a smaller spare tire is installed at a driven wheel. Trigger levels may also be increased using the non-driven wheel speed. That is, unwanted traction control triggering may be induced by a smaller rolling radius from a spare tire, tire wear, or low pressure. Therefore, raising the trigger level based on the non-driven wheel speed may reduce unintended triggering.

In step 78, a comparison of the driven wheel speed to reference speed is performed in step 78. In step 80, if the slip is not greater than the slip trigger threshold, step 70 is executed. In step 80, if the slip is greater than the slip threshold, step 82 is performed. In step 80, the slip threshold comparison may have to be true for a predetermined amount of time to prevent noisy wheel speeds from triggering the traction control. In step 82, normal traction control is applied. In step 86, the system ends.

TURNING COMPENSATION

It should also be noted that wheel speed differences due to steering geometry is present. That is, front and rear tires of a turning vehicle may have a different turning radius and thus, different velocities. If the vehicle velocities at both the front and rear locations are the same for a turning vehicle with front steering, the front wheels would need to turn at a higher angular rates due to the tire orientation when steered. Assuming all tires experience pure rolling and no lateral sliding, the following ratio between the front and rear angular rates may be set forth as $$\frac{\omega_r}{\omega_f} = \frac{1}{1/\cos\delta} = \cos\delta$$

and $$\frac{\omega_r - \omega_f}{\omega_f} = \cos\delta - 1.$$

Therefore, a reference vehicle speed or wheel rolling rotation reference speed of a driven tire may be compensated based upon the steering angle or steering geometry accordingly. Thus, a steering characteristic measured by steering wheel angle or steered wheel angle may be used to adjust the slip trigger threshold T. The slip trigger threshold may be influenced by both temperature and a turning characteristic of the vehicle or by the turning characteristic alone. The yaw rate may also be used to characterize the steering characteristic. In addition, the yaw rate may be determined by a difference in wheel speeds between the right and left sides of the vehicle which indicate the yawing of the vehicle. For a front wheel steer and rear wheel drive vehicle, a reference vehicle speed or a wheel rolling rotation reference speed may be set forth as $$V_{ref} = r\omega_f * \cos\delta$$

$$\omega_{ref} = \omega_f * \cos\delta$$

As can be seen, without steering geometry compensation $\omega_{ref} = \omega_f$, the target wheel speed for the driven rear wheels based upon the reference wheel speed would be larger than it would be and allows more slip than ideal during turning.

For a front wheel steer and front wheel drive vehicle, reference vehicle speeds and/or the rolling rotation reference speed may be given as $$V_{ref} = r\omega_r * (1/\cos\delta)$$

$$\omega_{ref} = \omega_r * (1/\cos\delta)$$

Figure 6:
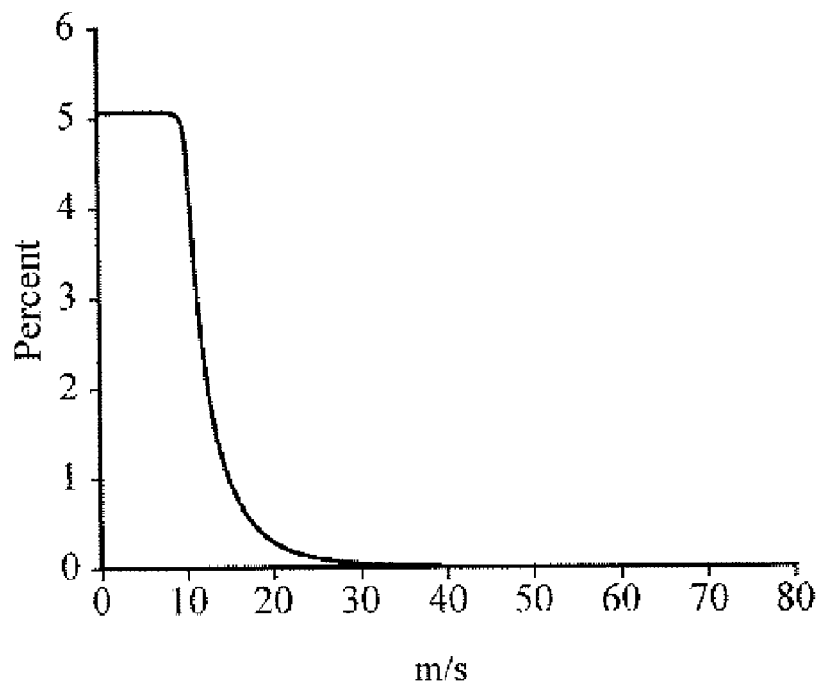
FIG. 6 is a plot of speed dependent maximum relative speed differences in percentage.
Figure 7:
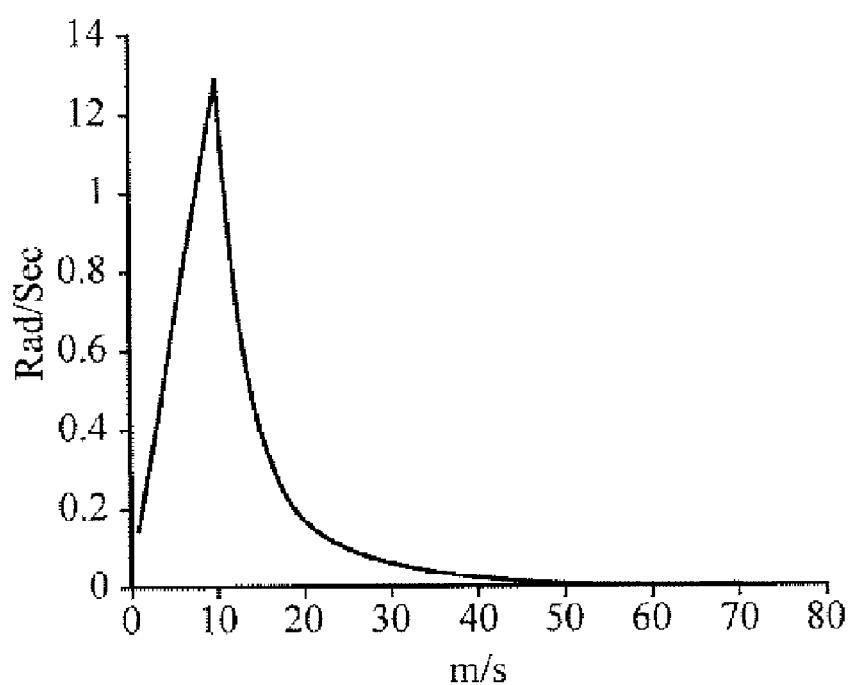
FIG. 7 is a plot of speed dependent maximum absolute speed differences in rad/sec.

Referring now to FIG. 6, a lateral acceleration and a minimum turning radius to limit the possible tire steer angle which is speed dependent may be given as $\delta_{max} = L/\max(10, V*V/9.8)$, (assuming L=3.2 m). Therefore, the speed dependent maximum relative speed differences in percentages is illustrated in FIG. 6. The speed dependent maximum (absolute) speed differences in ratings per second is illustrated in FIG. 7.

Vehicle yaw rate may be estimated based on wheel speed differences as mentioned above between the right and left wheels. That is, the yaw rate estimate may be given by $$\text{YawRate}_{est} = r \cdot (\omega_{left} - \omega_{right})/(\text{trackwidth})$$

and $$\delta_{est} = \text{WheelBase}/(V/\text{YawRate}_{est}) = (\text{WheelBase} * \text{YawRate}_{est})/V$$

As can be seen above, the present invention advantageously allows an improved system by adjusting the slip trigger independently of the slip target.

While particular embodiments of the invention have been shown and described, numerous variations and alternate embodiments will occur to those skilled in the art. Accordingly, it is intended that the invention be limited only in terms of the appended claims.

What is claimed is:

1. A method of controlling traction of a vehicle comprising:
   determining a slip target;
   determining an operating temperature;
   determining a traction control slip trigger threshold above the slip target in response to the operating temperature, the slip target being determined independently of the operating temperature; and
   entering a traction control mode when a driven wheel is above the slip trigger threshold.

2. A method as recited in claim 1 further comprising determining a non-driven wheel speed.

3. A method as recited in claim 1 wherein determining a non-driven wheel speed comprises determining the slip target in response to the undriven wheel speed.

4. A method as recited in claim 1 further comprising determining a slope of a slip curve and determining the slip trigger in response to the slope and the temperature.

5. A method as recited in claim 1 determining a slip acceleration and determining the slip trigger in response to the slip acceleration.

6. A method as recited in claim 1 further comprising adjusting the slip target in response to the operating temperature.

7. A method as recited in claim 1 wherein the operating temperature comprises ambient temperature.

8. A method as recited in claim 1 wherein the operating temperature comprises an air intake temperature.

9. A method as recited in claim 1 wherein entering a traction control mode entering the traction control mode when a driven wheel is above the slip trigger threshold to prevent a false trigger.

10. A method as recited in claim 1 further comprising determining a turning characteristic and wherein determining a traction control slip trigger comprises determining the traction control slip trigger threshold above the slip target in response to the temperature and the turning characteristic.

11. A method as recited in claim 10 wherein the turning characteristic comprises yaw rate.

12. A method as recited in claim 11 wherein the turning characteristic comprises steering angle.

13. A method as recited in claim 1 wherein determining a slip target comprises determining the slip target in response to a turning characteristic.

14. A method as recited in claim 13 wherein the turning characteristic comprises yaw rate.

15. A method as recited in claim 14 wherein the turning characteristic comprises steering angle.

16. A method of controlling traction of a vehicle comprising:
   determining a slip target;
   determining an turning characteristic;
   determining a traction control slip trigger threshold above the slip target in response to the turning characteristic, the slip target being determined independently of the turning characteristic; and
   entering a traction control mode when a driven wheel is above the slip trigger threshold.

17. A method as recited in claim 16 wherein the turning characteristic comprises yaw rate.

18. A method as recited in claim 16 wherein the turning characteristic comprises steering angle.

19. A method of controlling traction of a vehicle comprising:
   determining a slip target;
   determining a change in slip;
   determining a traction control slip trigger threshold above the slip target in response to the change in slip, the slip target being determined independently of the change in slip; and
   entering a traction control mode when a driven wheel is above the slip trigger threshold.

20. A method as recited in claim 19 wherein the change in slip corresponds to slip acceleration.

21. A method as recited in claim 20 wherein the change in slip corresponds to a slope of a slip curve.

* * * * *